US011759705B2

(12) United States Patent
Seiler

(10) Patent No.: US 11,759,705 B2
(45) Date of Patent: *Sep. 19, 2023

(54) MODULAR SYSTEM FOR BUILDING VARIABLE INTERACTIVE PLATFORMS AND ENCLOSURES FOR DEEP MULTISENSORY IMMERSION INTO AUDIO AND AUDIO-VISUAL ENTERTAINMENT

(71) Applicant: HAPTECH HOLDINGS, INC., Woodland Hills, CA (US)

(72) Inventor: Brock Maxwell Seiler, Jefferson Valley, NY (US)

(73) Assignee: HAPTECH HOLDINGS, INC., Woodland Hills (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/983,864

(22) Filed: Aug. 3, 2020

(65) Prior Publication Data

US 2021/0016163 A1    Jan. 21, 2021

Related U.S. Application Data

(63) Continuation of application No. 15/563,921, filed as application No. PCT/US2016/025927 on Apr. 4, 2016, now Pat. No. 10,729,974.

(Continued)

(51) Int. Cl.
*A63F 9/24* (2006.01)
*A63F 11/00* (2006.01)
(Continued)

(52) U.S. Cl.
CPC .............. *A63F 13/28* (2014.09); *G06F 3/016* (2013.01); *G09B 5/06* (2013.01); *A63F 2300/302* (2013.01)

(58) Field of Classification Search
CPC ...................................................... G07F 17/32
(Continued)

(56) References Cited

U.S. PATENT DOCUMENTS 4,479,238 A   10/1984 Spector
5,951,500 A    9/1999 Cutler
(Continued)

OTHER PUBLICATIONS

United States Patent Office, Notification of Transmittal of The International Search Report and The Written Opinion of The International Searching Authority, or The Declaration for International Application No. PCT/US2016/025927 (dated Jun. 27, 2016).
(Continued)

*Primary Examiner* — Adetokunbo O Torimiro
(74) *Attorney, Agent, or Firm* — Ziegler IP Law Group

(57) ABSTRACT

The present disclosure relates to a modular sensory immersion system including one or more panels that introduce the tactile component of audio vibration from multi-media formats into the various surface areas of the human body, while synchronized with audio to the ears. In certain embodiments, the modular sensory immersion system also delivers a range of additional haptic and multi-sensory stimuli synchronized to audio and audio-visual content. In one embodiment, each panel houses vibrating transducers and associated electronics to deliver the audio synchronized force feedback vibrations, as well as the mechanical components associated with the delivery air busts of ambient or heated/cooled variety, water streams and mists, fragrances, and solid or semi solid projectiles. The system can be used as a single interactive panel, as a multi-panel platform, or a multi-panel platform with attached paneled walls that deliver all of the above mentioned sensory stimuli.

20 Claims, 6 Drawing Sheets

Related U.S. Application Data

(60) Provisional application No. 62/142,647, filed on Apr. 3, 2015.

(51) Int. Cl.
*G06F 13/00* (2006.01)
*G06F 17/00* (2019.01)
*A63F 13/28* (2014.01)
*G09B 5/06* (2006.01)
*G06F 3/01* (2006.01)

(58) Field of Classification Search
USPC .......... 463/1, 5, 20, 22, 30, 39; 381/61, 84
See application file for complete search history.

(56) References Cited

U.S. PATENT DOCUMENTS

| | | |
|---|---|---|
| 7,149,318 B2 | 12/2006 | Bank et al. |
| 7,334,852 B2 | 2/2008 | Marihugh |
| 8,311,254 B2 | 11/2012 | Lipsky et al. |
| 8,984,568 B2 | 3/2015 | Mickelsen et al. |
| 9,576,445 B2 | 2/2017 | Cruz-Hernandez et al. |
| 10,213,272 B2 | 2/2019 | Pond et al. |
| 2003/0130595 A1 | 7/2003 | Mault |
| 2003/0164557 A1 | 9/2003 | Chung et al. |
| 2007/0055096 A1 | 3/2007 | Berry et al. |
| 2010/0217413 A1 | 8/2010 | Seiler |
| 2012/0089056 A1 | 4/2012 | Jiang et al. |
| 2012/0224719 A1 | 9/2012 | Johansson |
| 2014/0232535 A1 | 8/2014 | Strietzel |
| 2015/0070147 A1 | 3/2015 | Cruz-Hernandez et al. |
| 2018/0126263 A1 | 5/2018 | Seiler |

OTHER PUBLICATIONS

United States Patent Office, Notification of Transmittal of International Preliminary Reporton Patentability for International Application No. PCT/US2016/025927 (dated Jun. 30, 2017).

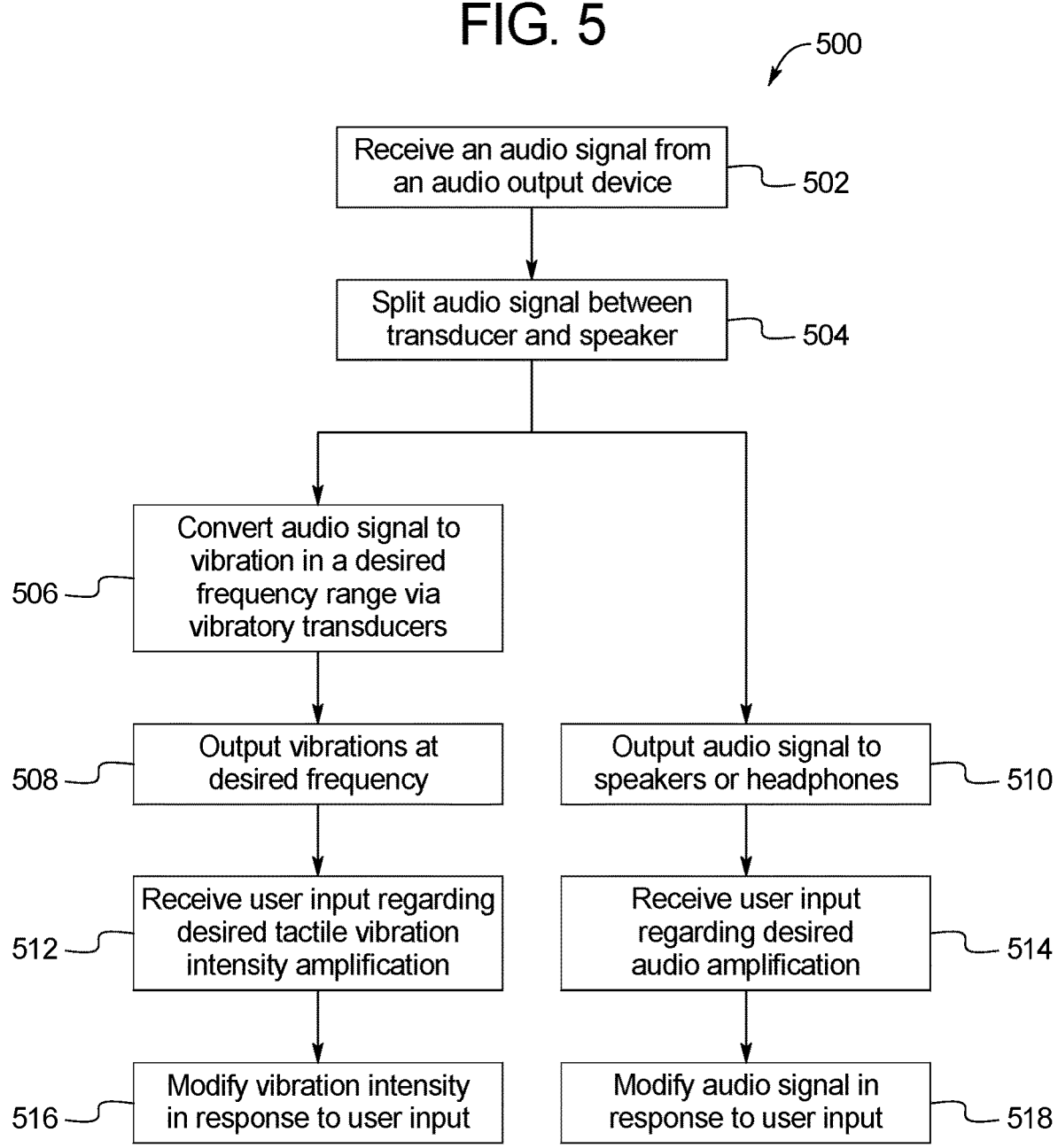

MODULAR SYSTEM FOR BUILDING VARIABLE INTERACTIVE PLATFORMS AND ENCLOSURES FOR DEEP MULTISENSORY IMMERSION INTO AUDIO AND AUDIO-VISUAL ENTERTAINMENT

CROSS-REFERENCE TO RELATED APPLICATIONS

This application is a continuation application of U.S. patent application Ser. No. 15/563,921, which is a U.S. National Phase Filing of International Application No. PCT/US16/25927, filed on Apr. 4, 2016, which claims priority to U.S. Provisional Patent Application No. 62/142,647, filed on Apr. 3, 2015. The contents of each said application is fully incorporated herein by reference.

BACKGROUND

Consumers of multi-media entertainment are seeking methods of heightened multi-sensory immersion. Existing systems for providing audio immersion includes use of a subwoofer to feel the low tones of music and to improve the audio of a motion picture or a video game, and the use of surround sound to immerse the user in a more entertaining experience. Aside from audio content, these methods do not provide a multi-sensory stimulation while in a virtual reality or other audio-visual scenario. These methods are exposed in an open environment including multiple stands, wires, and other devices that impart stimuli and are used by more than one person at a time. Furthermore, these methods may be damaging to the ears because they are often pushed too high in volume to create the immersive sound and feeling.

It would therefore be an advantage in the present state of the art to provide a useful alternative to produce a safe environment for people to experience multisensory stimulation while in a virtual reality or other audio-visual scenario by capturing the energy and vibration and immersive stimuli associated with audio-visual content in a portable personal expandable device that delivers improved immersive capabilities.

SUMMARY

The appended claims define this application. The Specification summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Various embodiments of the present disclosure provide a modular system for building variable interactive platforms and enclosures for deep multisensory immersion into audio and audio-visual entertainment, which is referred to hereinafter as a "modular sensory immersion system" for brevity. More specifically, various embodiments of the present disclosure provide a modular portable system that enables a user to experience a tactile component of audio vibration from multi-media formats along various surface areas of the human body, while listening to synchronized audio to the ears. In certain embodiments, the modular sensory immersion system also includes other forms of auido-visually synchronized haptics, such as wind movement and concussive forces, as well as other synchronized sensory effects like temperature, water impact, aroma, and a full range speaker. In certain embodiments, the modular sensory immersion system also acts as a three dimensional directional framework for the immersive audio and audio visual experience. Such a configuration enables a user the freedom to customize a multisensory delivery platform and enclosure with configurations adaptable to suit the content of the audio or audio-visual format they are engaging in.

One embodiment of the present disclosure includes a modular sensory immersion device for enhancing entertainment experience, which comprises a panel having at least one vibration transducer housed within the panel and a control unit including at least one processor in communication with at least one memory storing a set of instructions. In this embodiment, the processor is configured to receive a media signal comprising audio content, convert the audio content to a vibration through the vibration transducer, and output a vibration through the panel, wherein the output vibration is synchronized with the audio content. In certain embodiments, the modular sensory immersion device includes an audio output for outputting an audio output signal to an external audio speaker, external audio headphones, and one or more speakers on the modular sensory immersion device.

As described in greater detail below, the term audio signal referred to throughout this specification may refer to audio data or audio content within an audio signal and/or the audio data or audio content embedded within audio visual content. Various embodiments of the modular sensory immersion system of the present disclosure receive audio and/or audio visual content and provide various stimuli in synchrony with the audio and/or audio visual content.

In one variation of this embodiment, the modular sensory immersion device includes a recess for receiving a stimulus module. This stimulus module includes a processor in communication with a memory storing a plurality of instructions and one or more specific sensory control modules. In certain embodiments, the specific sensory control module provides a sensory output in addition to the vibration, and the sensory output may include ambient air bursts, heated air bursts, cooled air bursts, aroma bursts, water vapor, water droplets, solid projectiles, semi-solid projectiles, and full range audio output. In one variation of this embodiment, the control unit is external to the panel. In certain embodiments, the processor is also in communication with a user input/output device, and the user input/output device enables the user to control amplification of the vibration independent of an audio output signal. Certain embodiments of the modular sensory immersion device further include a wireless control module configured to provide wireless receipt and transmission of a media signal.

In an alternative embodiment of the present disclosure the modular sensory immersion device is incorporated into a modular sensory immersion system. More specifically, one embodiment of the present disclosure includes a modular sensory immersion system for enhancing entertainment experience, the system comprises two or more panels, wherein at least one panel is an active panel comprising at least one vibration transducer housed within the active panel. The modular sensory immersion system of this embodiment also includes a control unit including at least one processor in communication with at least one memory storing a set of instructions. The processor is configured to receive a media signal including audio content, convert the audio content to a vibration through the at least one vibration transducer, and output a vibration through the two or more panels, wherein the output vibration is synchronized with the audio content. In certain embodiments, the modular sensory immersion system also includes an audio output for outputting an audio output signal to an external audio speaker, external audio headphones, and one or more speakers on one or more of the two or more panels. In certain variations of this embodiment, the control unit of the modular sensory immersion system is housed within the at least one of the active panels of the system. In certain embodiments, the control unit is external to the two or more panels. In certain embodiments, the control unit is in communication with a user input/output device, and the user input/output device enables the user to control amplification of the vibration independent of an audio output signal.

In certain variations of this embodiment, each active panel of the modular sensory immersion system includes a recess for receiving a stimulus module, and the stimulus module includes a processor in communication with a memory storing a plurality of instructions and a specific sensory control module. The specific sensory control module provides a sensory output in addition to the vibration, and the sensory output may include ambient air bursts, heated air bursts, cooled air bursts, aroma bursts, water vapor, water droplets, solid projectiles, semi-solid projectiles, and full range audio output. In certain embodiments, the modular sensory immersion system also includes at least one passive panel. In certain embodiments, the two or more panels of the modular sensory immersion system are configured to be joined together to build a free standing wall. In certain embodiments, the two or more panels of the modular sensory immersion system are configured to be joined together to build a free standing room-like enclosure including a platform, walls, and a ceiling. In certain embodiments, the modular sensory immersion system also includes a wireless control module configured to provide wireless receipt and transmission of an audio output signal.

Another embodiment of the present disclosure includes a modular sensory immersion system for enhancing entertainment experience comprising two or more panels, wherein at least one panel is an active panel, which includes at least one vibration transducer housed within the active panel. This example embodiment of a modular sensory immersion system also includes a stimulus module configured to emit a sensory output, the stimulus module configured to fit within a recess of the at least one active panel, a control unit including at least one processor in communication with at least one memory storing a set of instructions, and the processor also in communication with the stimulus module. In this embodiment, the processor is configured to receive a media signal comprising audio content and stimuli commands, convert the audio content to a vibration through the at least one vibration transducer, output a vibration through the two or more panels, wherein the output vibration is synchronized with the audio content, and cause the stimulus module to output the sensory output, wherein the sensory output is based on the stimuli commands.

In certain embodiments of this system, the stimulus module includes a processor in communication with a memory storing a plurality of instructions and a specific sensory control module. The specific sensory control module provides a sensory output in addition to the vibration, the sensory output may include ambient air bursts, heated air bursts, cooled air bursts, aroma bursts, water vapor, water droplets, solid projectiles, semi-solid projectiles, and full range audio output.

In one variation of this embodiment, the control unit is housed within the at least one active panel. In another variation of this embodiment, the control unit is external to the two or more panels. In one embodiment, the control unit is in communication with a user input/output device, and wherein the user input/output device enables the user to control amplification of the vibration independent of an audio output signal.

In certain embodiments, this system with the stimulus module includes at least one passive panel. In certain embodiments, the modular sensory immersion system with the stimulus module includes two or more panels that are configured to be joined together to build a free-standing wall. In certain embodiments, the two or more panels of the modular sensory immersion system are configured to be joined together to build a free standing room-like enclosure including a platform, walls, and a ceiling. In certain embodiments, this system also includes an audio output for outputting an audio output signal to at least one selected from the group consisting of an external audio speaker, external audio headphones, and one or more speakers on one or more of the two or more panels. In one embodiment, this system also includes a wireless control module configured to provide wireless receipt and transmission of an audio output signal.

BRIEF DESCRIPTION OF THE DRAWINGS

For a better understanding of the invention, reference may be made to embodiments shown in the following drawings. The components in the drawings are not necessarily to scale and related elements may be omitted to emphasize and clearly illustrate the novel features described herein. In addition, system components can be variously arranged, as known in the art. In the figures, like referenced numerals may refer to like parts throughout the different figures unless otherwise specified.

FIG. 5 is a flowchart that illustrates an example process according to one embodiment of the present disclosure.

DETAILED DESCRIPTION OF EXAMPLE EMBODIMENTS

Figure 1:
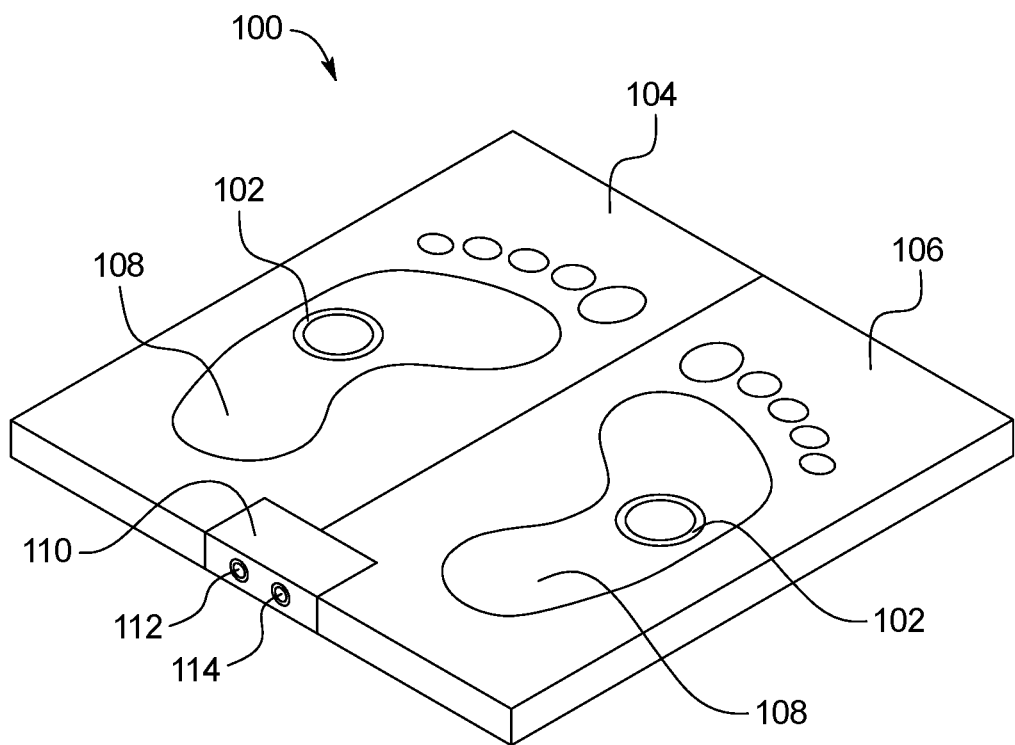
FIG. 1 illustrates an example embodiment of the present disclosure including a single active panel configuration.

While the modular sensory immersion system of the present disclosure may be embodied in various forms, the Figures show and this Specification describes some exemplary and non-limiting embodiments of the modular sensory immersion system. The present disclosure is an exemplification of the modular sensory immersion system and does not limit the system and method of the present disclosure to the specific illustrated and described embodiments. Not all of the depicted or described components may be required, and some embodiments may include additional, different, or fewer components. The arrangement and type of the components may vary without departing from the spirit or scope of the claims set forth herein.

Various embodiments of the present disclosure provide a modular sensory immersion system for enhancing an auditory experience for a user by providing a force feedback vibration and other sensations synchronized with an audio and/or audio-visual signal. More specifically, in one embodiment, the modular sensory immersion system of the present disclosure includes one or more panels that include one or more vibrating transducers, an audio input and an audio output, and a control unit to deliver the audio synchronized force feedback vibrations. These panels are referred to herein after as "active panels." In this embodiment, each active panel receives an audio input (such as through a media signal), converts the audio content of the media signal to a vibration output at a desired frequency, and transmits audible and inaudible vibration out of the panel to a user's body through the one or more vibration transducers, wherein the vibration output is synchronized with an audio output signal transmitted to the user by headphones or audible speakers. Such a configuration enables a user to feel a vibration in their body from the vibration transducers that is synchronized in real time with the audible signals. As such, various embodiments of the present disclosure may be used in a variety of applications.

The modular sensory immersion system of the present disclosure is fully modular, has portable capabilities, and can be utilized in any manner a user sees fit for audio synchronized force feedback and other immersive stimuli. In certain embodiments, active panels may be combined with other active panels or with passive panels to form an expanded, multi-panel system that covers a greater surface area. Passive panels are panels that passively receive and transmit vibration from one or more of the active panels or act as spacers between active panels. In certain embodiments, active panels further comprise a recess for receiving a stimulus module that provides other forms of audio-visually synchronized haptics, such as wind movement and concussive forces, as well as other synchronized sensory effects like temperature, water impact, aroma, and a full range audio speaker. In certain embodiments, the modular sensory immersion system also acts as a three dimensional directional framework for the immersive audio and audio visual experience.

It should be appreciated that the term audio signal referred to throughout this specification may refer to audio data or audio content within a media signal, an audio signal, and/or the audio data or audio content embedded within audio visual content. Various embodiments of the modular sensory immersion system of the present disclosure receive audio and/or audio visual content and provide various stimuli in synchrony with the audio and/or audio visual content. More specifically, in certain embodiments, the active panels and/or the stimulus modules inserted within active panel may be activated by an auditory signal and/or by stimuli command signals embedded in any portion of an audio-visual content data feed.

FIG. 1 illustrates a single panel configuration of the modular sensory immersion system of the present disclosure, which may be utilized in, for example, a car as a floor mat to communicate better audio quality to the driver and passengers. The device is capable of stereo performance, and therefore may act as a tactile aid in GPS guidance for the driver of a vehicle. More specifically, FIG. 1 illustrates an active panel 100, including one or more vibration transducers 102, a control unit 110 providing power and amplification to activate the one or more vibration transducers 102, and an audio hard-wired stereo input 112 and hard-wired headphone output 114. In certain embodiments the active panel 100 includes a wireless communication module (not shown) for wireless audio input and output connections.

In the example embodiment illustrated in FIG. 1, the active panel 100 includes a stereo right/left split. More specifically, in this example embodiment, the panel has been further divided into a left segment 104 for the left foot, and a right segment 106 for the right foot. This example embodiment further includes ergonomic foot pads 108 to assist a user with foot placement to maximize force feedback. In this embodiment, the active panel 100 includes two vibration transducers 102—one within the left segment 104 of the panel and one within the right segment 106 of the panel. Accordingly, in this example embodiment, when the modular sensory immersion system provides force feedback to the user's feet, the vibration feedback may be provided in a split configuration for stereo right channel vibration for right foot, and stereo left channel vibration for left foot. In certain alternative embodiments, the active panel does not include foot pads such as 108. It should also be appreciated that in certain alternative embodiments, an expandable panel may include more or less vibration transducers arranged in a different pattern or location to provide a desired output.

In certain alternative embodiments, the active panel includes a mono audio synchronized vibration. More specifically, for panels that provide mono vibration, the vibratory output is synchronized for all vibration transducers within the active panel. For such a configuration, the modular sensory immersion system does not provide a different vibration output on the right side of the panel from the left side of the panel, but rather a synchronized output from all transducers within the active panel.

In the embodiment illustrated in FIG. 1, the control unit 110 (described in greater detail below in connection with FIG. 4A) is housed within the active panel 100. In certain alternative embodiments, the control unit, or portions of the control unit may be external to the active panel itself.

Figure 2:
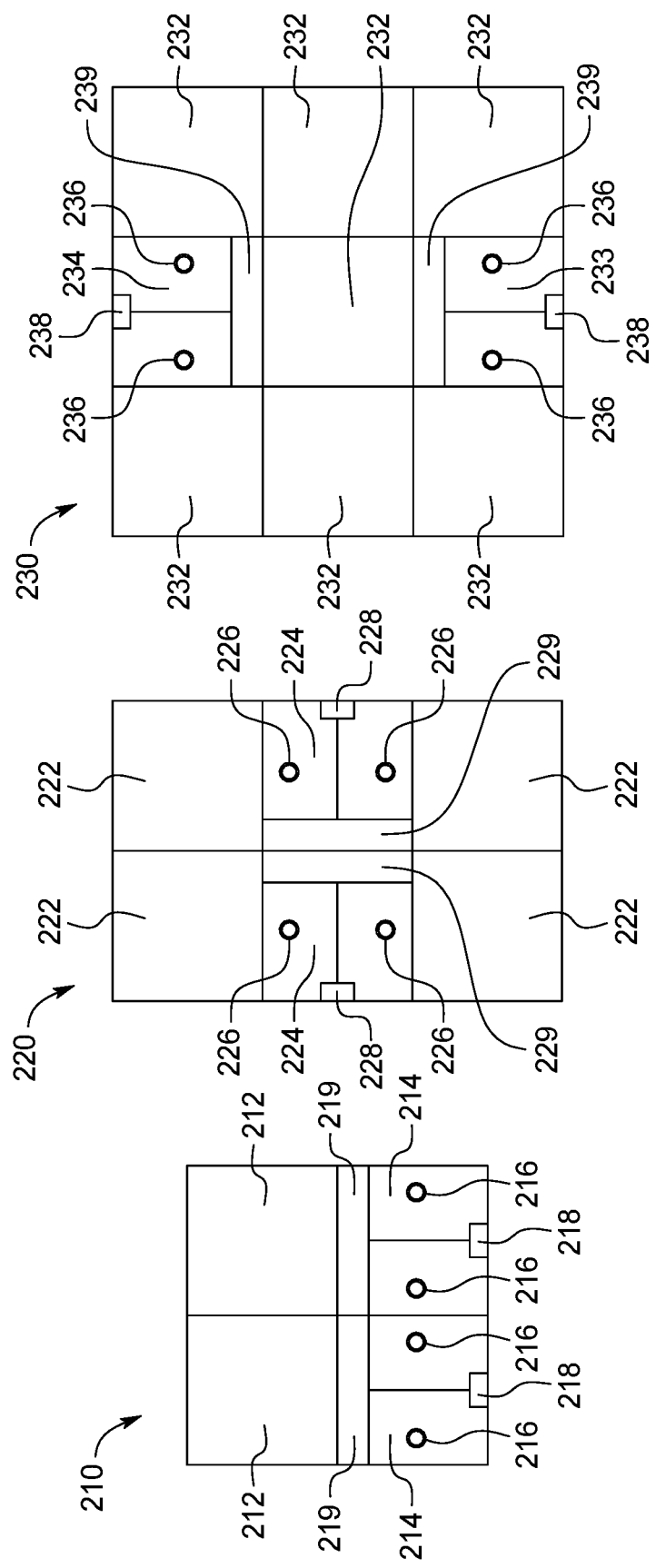
FIG. 2 illustrates example embodiments of the present disclosure including multi-panel configurations.

As illustrated in FIG. 1, in certain embodiments, the panel 100 resembles a floor mat or a floor board. The panels may be made from various materials such as, but not limited to, plastic, rubber, glass, wood, or any combination of the above listed and other materials as needed to house and functionally merge the preferred electronics of the active panel 100 and any stimulus modules (not shown in FIG. 1) for haptic and multisensory delivery of the desired immersive effects. Accordingly, the single panel 100 allows for a user to experience the tactile/vibratory effect while sitting with feet on top of the panel 100, standing or walking with feet on the panel 100, as well as while sitting on the panel 100 itself, or laying on an expanded multi-panel configuration of the system (for example, as shown in FIG. 2).

It should be appreciated that the dimensions of each panel vary based on the application of the panels and on the user's preferences. In the example embodiment illustrated in FIG. 1, the single panel 100 is a 16"×16" panel made of suitable material and the panel is 0.75" thick. It should be appreciated that thickness may vary to achieve the required internal dimensions to house a variety of stimulus modules (explained in greater detail below). In certain alternative embodiments, the panel includes a different shape, including, but not limited to, a rectangle, or a hexagon. It should be appreciated that the panel size and the thickness may be altered to provide a suitable shape for any user. In an alternative embodiment, one variation requires the selected materials to support the forces associated with a user's bodyweight while simultaneously transmitting vibration energy to the user. An example would be a single active panel with a control unit that is 16"×16" square and 1" thick (see FIG. 1). However, thickness may vary to achieve various desired intensities of vibration feedback. In certain alternative embodiments, the panels may be anywhere from 1" to 4" thick.

One application of this example embodiment is for use in a vehicle as a floor mat to communicate better audio quality to the driver and passengers. In one example of such an embodiment, the modular sensory immersion device is capable of stereo performance, and therefore may act as tactile aid in GPS guidance for the driver of a vehicle. A version of this application could be built in to the automobile floor boards as a factory option from the auto manufactures. When a user engages such an embodiment, the user experiences enhanced audio immersion though audio-synchronized force feedback to the feet. This single panel application may also house stimulus modules for other sensory effects as described herein.

It should be appreciated that in certain embodiments, as described in greater detail below in connection with FIGS. 3 and 4B, the active panel further includes a recess (not shown in FIG. 1) for receiving a stimulus module. The stimulus module provides sensory outputs for other immersive stimuli in addition to the vibration outputs from the active panel. The stimulus modules provide immersive stimuli in addition to the vibratory output of the active panel based on audio-visual content. In certain embodiments, stimulus module activation may be synchronized to audio content, audio-visual content, or both. In certain alternative embodiments, as described in greater detail below, stimulus modules may provide various immersive stimuli that may or may not be in synchrony with the audio and/or audio visual content. In other words, in certain embodiments, the stimulus modules may be able to independently receive and respond to real time embedded command codes in an audio-visual feed. Such a configuration provides an additional sensory immersive quality to the audio visual experience.

In certain embodiments, one or more active panels may also be fitted with suitable virtual reality tracking system sensors of electromagnetic, acoustic or optical design to allow for mobility tracking of the virtual reality user within the enclosure, as well as proximity sensors to alert the user and prevent collision with vertical walls within the enclosure.

Accordingly, a single-panel configuration of the modular sensory immersion system provides a single active panel that is portable, and versatile for a variety of applications. In addition to the example embodiment described above, a single-panel configuration of the modular sensory immersion system can be applied to the consumer's desire for immersive audio synchronized force feedback and other immersive stimuli for video games, music, virtual reality, watching a movie, playing an app.

Turning to FIG. 2, shown are three examples of different multi-panel configurations of the modular sensory immersion system of the present disclosure. Multi-panel configurations of the modular sensory immersion system of the present disclosure include combining two or more panels to expand the modular sensory immersion system to a custom fit immersive system for each user based on user preference and the application. For example, the expanded, multi-panel configurations of the present disclosure may be utilized for the same purposes as single panel configurations and also for a multiple panel platform, such as for a yoga mat-like configuration, allowing deep, whole body relaxation, meditative states, and all of the therapeutic effects of vibratory stimuli, while standing, sitting, or lying down and while synchronized with audio or audio-visual content.

More specifically, in certain embodiments, as illustrated in FIG. 2, the modular sensory immersion system of the present disclosure includes one or more active panels 214, 224, 234 linked to one or more passive panels 212, 222, 232 for expanding the sensory immersive surface area. Passive panels are panels that are composed of a suitable vibratory conductive material that passively receives and transmits vibration from one or more of the active panels or act as spacers between active panels. As shown by the three different layouts of the embodiments 210, 220, 230 of FIG. 2, the passive and active panels may be configured in any sequence. More specifically, the first arrangement 210 is a four-panel arrangement that includes two active panels 214 and two passive panels 212. The second arrangement 220 is a six-panel arrangement that includes two active panels 224 and four passive panels 222. The third arrangement 230 is a nine-panel arrangement that includes two active panels 234 and seven passive panels 232. Each arrangement provides a unique immersive effect and covers a different surface area. In certain embodiments, active panels are linked with other active panels for maximum force feedback over larger body surface areas.

In certain embodiments, the active panels and the passive panels may snap into place, may be linked via tongue-in-groove, or may be magnetically linked. In certain embodiments, the passive panels are the same dimensions as the active panels. In certain alternative embodiments, the passive panels may have different dimensions to suit the user's application. Accordingly, each multi-panel configuration of the modular sensory immersion system of the present disclosure provides a modular and expandable system to cover as many square feet as needed.

Referring back to FIG. 2, in this example embodiment, each active panel 214, 224, 234 includes transducers 216, 226, 236, and control units 218, 228, 238, respectively. Each of the three example configurations 210, 220, 230 illustrated in FIG. 2 includes more than one active panel. As such, in each of these configurations, there are at least two control units capable of controlling the two different active panels.

In certain embodiments, each control unit operates its associated active panel independently of the other active panel in the system. In certain embodiments when more than one active panel is included within a multi-panel configuration, the control units act in synchrony (for example through a wireless connection), so as to operate each of the active panels of the configuration in the same manner and/or at the same time. In certain embodiments, when configuring a multi-panel system, an external device controls each of the active panels of the system. In certain embodiments, this external device is a personal computer, or mobile phone, or any media device capable of wirelessly communicating with all of the active panels of the configuration.

The control units 218, 228, 238 each include a power source (not shown) for powering the active panel and surrounding passive panels. In certain embodiments a single active panel can use its power supply or a power linking method can be implemented to channel AC or DC power to all desired active panels directly, or through passive panel linkage.

In certain embodiments, the modular sensory immersion system can also employ a pressure activation switch to activate vibration and extend battery life, and have a rechargeable or direct DC converter power supply. More specifically, in certain embodiments, pressure activation switches and/or sensors may be located on and/or within any passive and active horizontal platform panels to signal a tracking function that monitors a user's movement as they walk around on active panels and passive panels. This tracking signal data from stepping on pressure activated sensors can be used to activate transducers in active panels, influence video game or virtual reality content that is in communication with transducers and stimulus modules, and act as a controller of video game or virtual reality content.

Each of the control units 218, 228, 238 also include an audio input and output (not shown) for receiving and transmitting a media signal including audio content. In certain embodiments, a configuration with more than one active panel can employ a modification which links all active panels to one audio source media device. In certain embodiments, if desired, the source audio can also be transmitted through passive panels to link to an active panel.

In certain embodiments, the active panels 214, 224, 234 also include a recess for receiving a stimulus module, which provides other haptic and multisensory effects. For example, in FIG. 2, active panel 214 includes recess 219, active panel 224 includes recess 229, and active panel 234 includes recess 239. In certain embodiments, a stimulus module is a suitable mechanical device that provides other synchronized and or unsynchronized effects. More specifically, in certain embodiments, the stimulus modules deliver audio and/or audio-visually synchronized bursts of ambient air, heated air, cooled air, water vapor, water droplets, fragrances, and small projectiles. An example of other stimuli would be the upward direction of air bursts to simulate falling in a video game, movie or virtual reality scenario. In certain embodiments, the stimulus modules provide these effects independent of the audio visual content. More specifically, in certain embodiments, the stimulus module receives and responds to a real-time command signal embedded in an audio-visual feed that is independent of the actual audio-visual content.

As described in greater detail below in connection with FIG. 4B, stimulus modules are equipped with a processor (such as a digital microprocessor) capable of receiving wireless transmission of stimuli commands from digital media content. The stimulus modules will become activated by embedded signals in the digital media signal. In certain embodiments, the digital media signal is an audio-visual feed from but not limited to, music, an app, a smart phone, a movie, a video game, or a virtual reality feed. In certain embodiments, the embedded signals command a response from the stimulus modules synchronized with the appropriate content, similar to the way embedded "haptic output signals" are used to synchronize vibration of a video game controller to video content. In other embodiments, the embedded signals command a response from the stimulus modules independent of the content in the digital media signal so as to provide a sensory effect (i.e., such as a burst of air) independent of the audio-visual content. As such, electronic media utilized with the present invention will require the addition of such embedded coding. In various embodiments, the electronic media is transmitted from but not limited to, music, an app, a smart phone, a movie, a video game, or a virtual reality feed.

It should be appreciated that the modular sensory immersion system of the present disclosure is configured to process incoming data feeds for all singular and multi-panel embodiments in a manner that enables activation of any transducer or stimulus module independently or in concert with any combination of other transducers or stimulus modules, as directed by the stimuli commands embedded within in an audio-visual data feed, or by activation though pressure activated sensors.

Accordingly, when a user engages the above-described embodiment, the user experiences enhanced audio immersion over multiple surface areas of their body through audio and audio-visual-synchronized force feedback. They may also experience other synchronized stimuli via stimulus modules.

Figure 3:
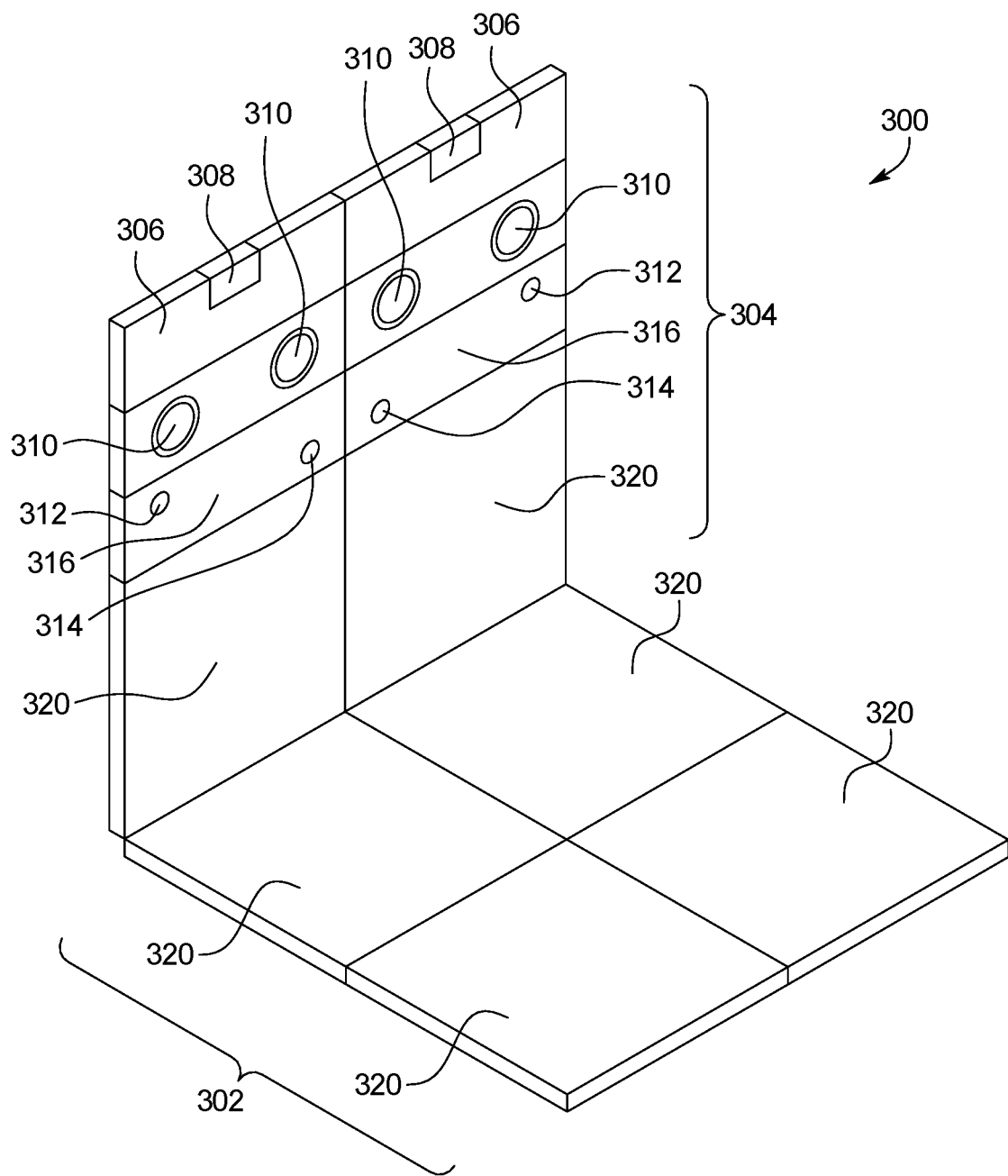
FIG. 3 illustrate an example embodiment of the present disclosure including a multi-panel wall and base configuration.

Turning to FIG. 3, in certain embodiments, panels may be added to the perimeter of a platform (such as those illustrated in FIG. 2) to build vertical walls that house a variety of stimulus modules that deliver all of the sensory experiences outlined above, synchronized to all forms of audio or audio-visual formats used in electronic multi-media. More specifically, in addition to building an audio-visually synchronized horizontal stimulus platform, the present invention can utilize active and passive panels to build vertical walls. Active panels in these vertical walls contain recesses for the insertion of a variety of stimulus modules. FIG. 3 illustrates an example embodiment of a multi-panel wall and base configuration 300 of the modular sensory immersion system of the present disclosure. This multi-panel configuration 300 includes a first plurality of interlocked active panels 306 and passive panels 320 configured to create a vertical wall 304, and a second plurality of interlocked passive panels 320 configured to create a horizontal base 302. Each active panel 306 includes at least one transducer 310 and a control unit 308.

It should be appreciated that although each active panel 306 of this embodiment is shown as including at least one transducer 310, in certain alternative embodiments, certain active panels may include more or less than one transducer 310. More specifically, for a vertical wall configuration, certain active panels may include a stimulus module, but no transducer. This is because, unlike the active panels of the horizontal/platform illustrated in FIG. 2, which are designed to at least impart vibration to the user's body, in certain embodiments, the active panels included within the vertical wall configuration and/or the ceiling panel configuration will not necessarily make physical contact with the user. Therefore active panels in the vertical wall and/or ceiling applications will require at least one of the stimulus modules but not necessarily a transducer.

Where, as here, a transducer 310 is used in a vertical and/or ceiling active panel, such as the panels 306 shown in FIG. 3, the active panels may allow haptic force feedback, when appropriate, and may allow such vibration to produce resonance in the panels and the room enclosure, so as to simulate the effect of an audio speaker. In one example embodiment, this audio effect is created through the use of an equalizer that transmits signals to such transducers in the audible range of 20 Hz to 20 KHz.

Returning to the example embodiment illustrated in FIG. 3, a section of the perimeter of the rows of active panels 306 and passive panels 320 are joined together to build a vertical wall 304 fitting together in tongue-in groove or other suitable fashion, and are added to a combination of horizontal panels 302. In one embodiment, the horizontal panels 302 are a combination of active panels and passive panels such as the configurations depicted in FIG. 2. In the illustrated example embodiment, the horizontal panels 302 include a combination of passive panels 320. In certain embodiments, a stabilizing base (not shown) may be attached to the outer perimeter of the bottom row of vertical wall panels to stabilize and support the vertical wall. The stabilizing base may include any suitable number and type of connectable members that broaden the base of the bottom row of vertical wall panels and project outside the perimeter of the horizontal panels, for example, to keep the vertical wall construction from falling over. It should be appreciated that vertical and horizontal panel configurations are facilitated by appropriate braces and brackets to allow for a multitude of platform and enclosure varieties as dictated by the type of electronic media content in use.

It should be appreciated that in certain embodiments, the panels could be combined in a similar manner to create a vertical wall and a horizontal ceiling portion. In such an embodiment, the ceiling portion includes a suitable ceiling panel suspension system. Furthermore, in such an embodiment, the panels used to configure a ceiling may include active panels and passive panels that have any of the functional characteristics of the active and passive panels used in the horizontal panel construction described in connection with FIG. 2 and/or the vertical wall construction described in connection with FIG. 3. In certain embodiments, the panels of the modular sensory immersion system are configured to be joined together to build a free standing room-like enclosure including a platform, walls, and a ceiling.

It should also be appreciated that the embodiment illustrated in FIG. 3 may become a partial or full enclosure simulating a small room. In certain embodiments, walls may be constructed to any desired or required height to suit the chosen electronic media interaction with the addition of added rows of active or passive panels. The user can position active panels within the constructed enclosure to allow the delivery of a variety of audio and audio-visually synchronized stimuli via the use of selected stimulus modules.

In this embodiment, the active panels 306 include a recess 316 for receiving a stimulus module. The active panels 306 are of sufficient thickness to allow the various stimulus modules to fit flush with the surface of the panel. This produces a smooth wall that does not present outwardly projecting obstacles to the user when in virtual reality mode, resulting in a safe, user friendly, smart room environment. In certain embodiments, stimulus modules are designed to fit into specific recesses in an active panel that contain suitable ports for power and data supply (not shown). In certain embodiments, stimulus modules are designed to become activated by output signals embedded in the electronic media signal that are synchronized to specific media content. As described in greater detail below in connection with FIG. 4B, stimulus modules will contain the necessary mechanical components to deliver bursts of air, both heated or cooled, bursts of fragrance, such as the smell of a field of flowers, gun powder, napalm, or automotive exhaust, as well as fine mists, water sprays, and small solid or semi solid projectiles.

In various embodiments of multi-panel configurations, with a plurality of active panels, each multi-panel configuration also includes a plurality of control units. As described above, in connection with FIG. 2, in certain embodiments, the control units operate each active panel independent of the other active panels. Such a manner of operating the active panels is ideal for an embodiment including a variety of stimulus modules. For example, in certain embodiments, each active panel of a multi-panel system may include a different stimulus module for different aspects of the virtual reality scenario. Thus, one active panel may be configured to emit bursts of heated air, while another active panel may be configured to emit drops of water. As such, each control unit of each active panel may be programmed to operate differently independent of one another.

In certain embodiments, each control unit of each active panel is synced with the other control units of the other active panels in the multi-panel configuration so that each control unit operates the associated active panel in the same manner as other active panels. In certain embodiments, the panels are directly connected. In other embodiments, the panels are linked through passive panels, as described above. In another alternative embodiment, an external control device controls each of the active panels of the system, as described above in connection with FIG. 2.

In certain embodiments, the vertical wall panel configuration includes one or more active panels with a touch screen element. The touch screen element can use resistive or capacitive technology. In such embodiments, the touch screen position along the vertical wall and/or within the enclosed smart-room is formatted into a given virtual reality scenario's tracking programming, allowing a user to physically navigate to them when in virtual reality and activate them via touch as a means of interacting and controlling virtual reality content though signals generated by touching these screens.

For both singular panel embodiments and multi-panel embodiments, the modular sensory immersion system's processing power for processing an incoming data feed can be capable of activating any transducer and/or stimulus module independently, or in concert with any combination of other transducers and/or stimulus modules as directed by the stimuli commands embedded in any audio visual data feed, or by activation through pressure activated sensors.

In various embodiments of the modular sensory immersion system, select active panels further include one or more sensors. In certain embodiments, selected active panels allow the input of virtual reality tracking sensors to synchronize body movement to the virtual reality format, as well as inputs for motion detection sensors to keep the user run running in to the walls while immersed in the virtual reality content. More specifically, in certain embodiments, the virtual reality tracking system sensors include an electromagnetic, acoustic, or optical design for mobility tracking of the virtual reality user within the enclosure, as well as proximity sensors to alert the user and prevent collision with vertical walls within the enclosure. In this embodiment, the active panels 306 house a virtual reality tracking system sensor 312 and a proximity alarm sensor 314.

The desired effect is to create a safe enclosure in which a full range of haptic and other stimuli is received by the user that helps simulate the tactile, auditory and olfactory content of virtual reality, movies, or video games.

Figure 4A:
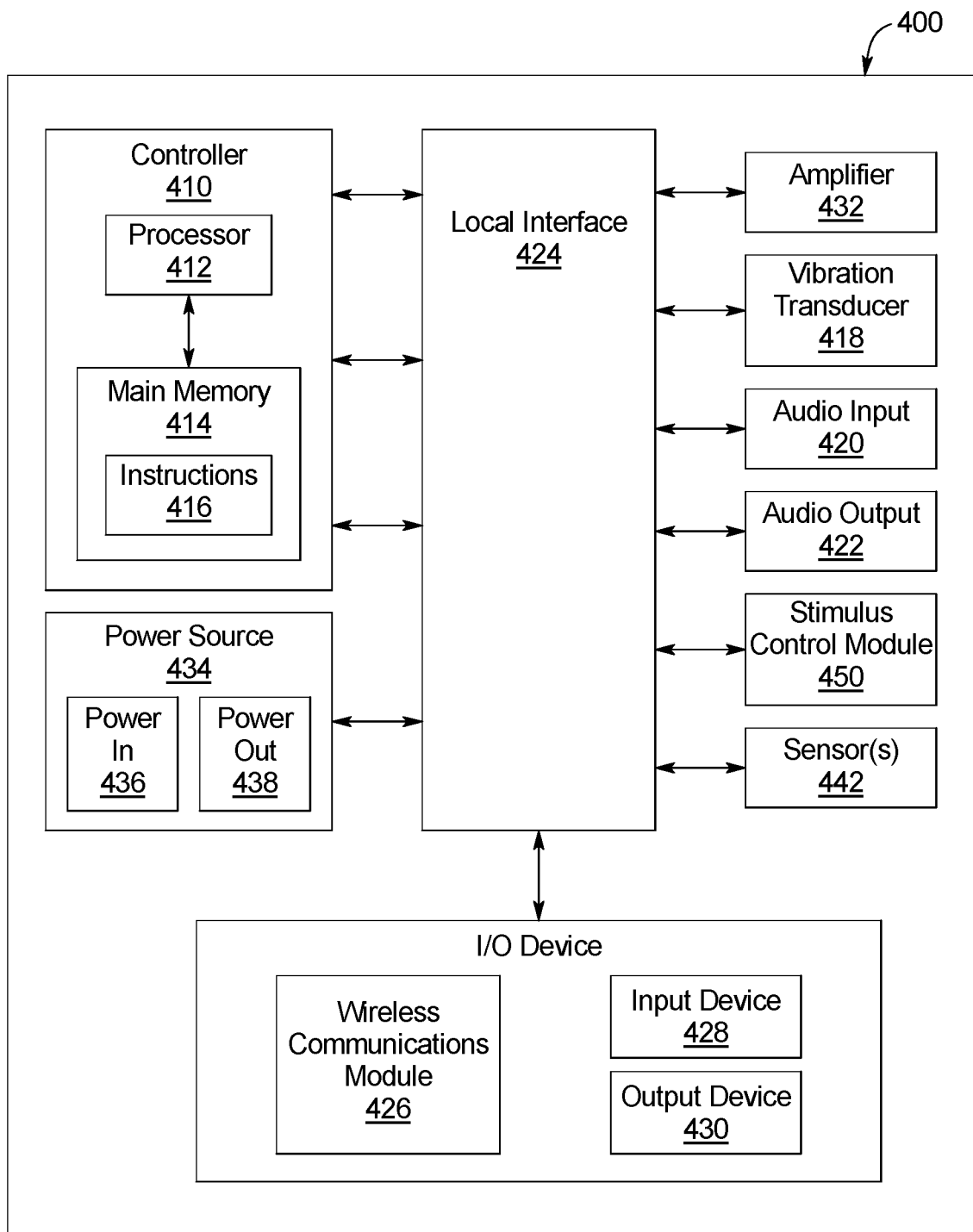
FIG. 4A is a block diagram including components of one embodiment of the modular sensory immersion system of the present disclosure.

Turning to FIG. 4, which illustrates a block diagram of the components within one example embodiment of a modular sensory immersion system 400 of the present disclosure. Various embodiments of the modular immersion system of the present disclosure include at least one active panel such as the active panel 100, 214, 224, 234 and various components housed within the active panel 100, 214, 224, 234. Other embodiments of the modular sensory immersion system may include different, fewer, or additional components than those described below and shown in FIG. 4A.

In one embodiment, the modular sensory immersion system 400 includes a controller 410 that receives a media signal including audio content from the audio input 420, converts the signal for a vibration output through the vibration transducers 418 and splits the audio content between the transducer 418 and an audio output 422 for a synchronized output. In certain embodiments the audio output 422 transmits the audio output signal to speakers or headphones. In certain embodiments, the speakers are external to the panel. In certain embodiments, the speakers are built into the panel. Each of the components can be communicatively coupled to one another through a local interface 424.

More specifically, the modular immersion system 400 includes one or more vibration transducers 418 and one more amplifiers 432 in communication with a local interface 424. A vibration transducer 418 is a device that converts one form of energy to another. More specifically, a vibration transducer, also known as a tactile transducer, is a device that is configured to convert one form of energy, such as an audio signal, into a vibration. The vibration transducer 418 transmits low-frequency vibrations into various surfaces so that they can be felt by people. In certain embodiments, a separate amplifier 432 is provided for each of the vibration transducers 418; however, if desired, a single amplifier may be used to drive multiple vibration transducers 418.

The controller 410 of the modular sensory immersion system includes at least one processor 412 in communication with a main memory 414 that stores a set of instructions 416. The processor 412 is configured to communicate with the main memory 414, access the set of instructions 416, and execute the set of instructions 416 to cause the modular sensory immersion system 400 to perform any of the methods, processes, and features described herein. The processor 412 may be any suitable processing device or set of processing devices such as, but not limited to: a microprocessor, a microcontroller-based platform, a suitable integrated circuit, or one or more application-specific integrated circuits (ASICs). In certain embodiments, the processor includes a digital signal processor to achieve various audio/vibratory effects as well as equalization presets.

The main memory 414 may be any suitable memory device such as, but not limited to: volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); or read-only memory.

The local interface 424 may be, for example, but is not limited to, one or more buses or other wired or wireless connections, as is known in the art. The local interface 424 may have additional elements, which are omitted for simplicity, such as controllers, buffers (caches), drivers, repeaters, and receivers, to enable communications. Further, the local interface 424 may include address, control, and/or data connections to enable appropriate communications among the other computer components.

The modular immersion system 400 further includes a power source 434 in communication with the local interface 424 for powering the modular immersion system 400. The power source includes a power input 436 and a power output 438 for connecting to other panels of the modular sensory immersion system 400. The power source 434 is preferably a rechargeable battery, or batteries, however, any suitable power source may be used. The power source 434 should provide sufficient voltage and current to power the controller 410, amplifier 432, and the vibration transducers 418 to initiate vibration.

In certain embodiments, the modular sensory immersion system 400 also includes an input device 428, an output device 430, and a wireless communication module 426 communicatively coupled to the locale interface. In certain embodiments, the input device 428 and output device 430 (I/O) may include interactive hardware that is internal to the modular sensory immersion system 400, or external and connected wirelessly or via connection cable and/or I/O ports. The I/O devices can include input devices 428, for example but not limited to, input modules for programmable logic controllers (PLCs), a keyboard, mouse, scanner, microphone, touch screens, stylus, radio-frequency device readers, input hardware (e.g., buttons, switches, sliders, knobs, dials, and the like), etc. Furthermore, the I/O devices may also include output devices 430, for example but not limited to, output modules for PLCs, displays, haptic devices (e.g., actuators), lights (e.g., LEDs; such as, for example, the output devices 430), audio output devices (e.g., speakers), etc.

In certain embodiments, a microphone may be employed as an attachment or built into the active panel control unit 110 to pick up the surrounding environment sound. In certain embodiments, the picked-up sounds can be converted to vibrations that are felt by the user in synchrony with the surrounding sound. In certain embodiments, the system may house LEDs for various functions, including but not limited to pulsing in synchrony with the intensity and rhythm produced by the transducers.

The I/O devices 506 further comprise devices that communicate with both inputs and outputs, including, but not limited to, a wireless communication module 426. More specifically, in certain embodiments the modular immersion sensory system 400 includes wireless communication module 426 which provides wireless audio in/out technology that can command vibration transducers or any other vibration actuator or motor capable of synchronizing audible and inaudible commands to vibration. It should be appreciated that while FIG. 4A illustrates an audio input, in certain embodiments, the audio content received at the active panel is embedded within audio-visual content. It should further be appreciated that in certain embodiments, the audio-visual content is embedded with commands for a stimulus module 450 which, as described in greater detail below in connection with FIG. 4B, are communicated to a controller 452 within the stimulus module 450 through an active panel input 468.

The wireless communication module 426 may include one or more antennas (not shown) configured to wirelessly transmit signals to, and/or receive signals from, at least other components of the modular sensory immersion system 400. The wireless communication module 426 further includes one or more receivers, transmitters, and/or transceivers (not shown) that may be communicatively coupled to the one or more antennas for processing the received signals, providing the transmitted signals, or otherwise facilitating wireless communication with other components of the system 400. The wireless communication module 426 may also include a modulator/demodulator (modem; for accessing another device, system, or network, such as, e.g., another component within the wireless system 400), a bridge, and/or a router.

The exact type of wireless communication technology included in the wireless communication module 426 can vary depending on the system 400 and may include at least one of short-range wireless communication technology (such as, e.g., radio frequency (RF), Bluetooth, infrared, and/or NFC technology) and longer-range or broadband wireless communication technology (such as, e.g., WiFi, WiMax, other wireless Ethernet, cellular, GPS, and/or satellite technology). In some cases, the wireless communication module 426 may include more than one antenna and corresponding transceiver(s) in order to communicate over different wireless networks.

In some cases, the modular sensory immersion system can also include hardware for implementing one or more aspects of the techniques described herein. In such cases, the hardware utilizes any of the following technologies, or a combination thereof, which are each well known in the art: a discrete logic circuit(s) having logic gates for implementing logic functions upon receiving data signals, an application specific integrated circuit (ASIC) having appropriate combinational logic gates, a programmable gate array(s) (PGA), a field programmable gate array (FPGA), etc.

In certain embodiments, the modular immersion sensory system 400 also includes one or more sensors 442. For example, in certain embodiments, certain virtual reality tracking sensors for tracking the virtual reality user within the enclosure, and proximity sensors to alert the user and to prevent collision with vertical walls within the enclosure. In certain embodiments, these sensors include an electromagnetic, acoustic or optical design.

As described above, in certain embodiments, the modular immersion sensory system 400 includes a stimulus module 450 in communication with the local interface 424. The stimulus module 450 is inserted into an active panel of the modular sensory immersion system 400 of the present disclosure. The modular sensory immersion system 400 activates stimulus modules 450 by transmitting embedded data or stimuli command signals from the digital media signal, such as an audio-visual feed (including audio content and/or audio-visual content), to the stimulus module 450. The stimulus module 450 is illustrated in greater detail in FIG. 4B.

Figure 4B:
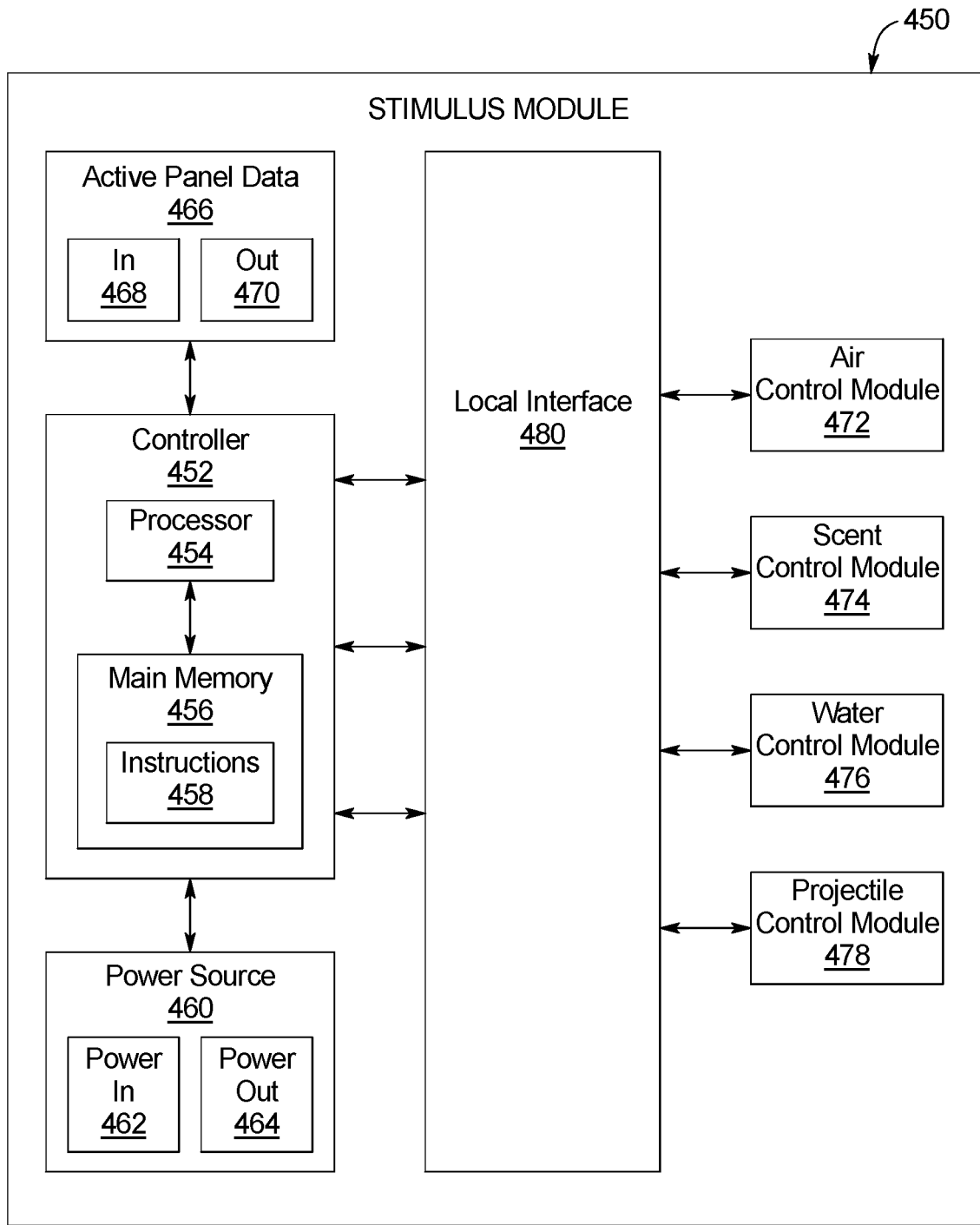
FIG. 4B is a block diagram including components of one embodiment of the stimulus module of the present disclosure.

Turning to FIG. 4B, each stimulus module 450 includes a controller 452, processor 454, and a memory 456 storing a set of instructions 458 similar to the controller 410, processor 412, memory 414, and instructions 416 described above in connection with FIG. 4A. The stimulus control module includes a power source 460 with a power input 462 and a power output 464. In certain embodiments the stimulus module is powered by the power output 464 of the active panel in the modular sensory immersion system. The stimulus control module 450 includes an active panel data input 468 and output 470 for communicating with the active panel into which the stimulus module is inserted. Each of these components is communicatively coupled to one another by a local interface 480, similar to the local interface 424 described above in connection with FIG. 4A.

In various embodiments, the modular sensory immersion system 400 receives the audio-visual feed with embedded stimuli commands for the stimulus module 450. The modular sensory immersion system 400 receives these data commands, either though hard wire or wireless transmission from but not limited to, music, an app, a smart phone, a movie, a video game, or a virtual reality feed. These data commands may be either standard elements of the associated media feed, or ones that have been custom programmed for use by this type of system. In certain embodiments, stimulus modules 450 may be programmed to function in synchrony with audio-visual content. In certain alternative embodiments, the stimulus modules 450 may alternatively or additionally be able to independently receive and respond to real time embedded command codes in an audio-visual feed. As such, in certain embodiments, the digital media signal is synchronized with the appropriate audio-visual content, similar to the way embedded "haptic output signals" are used to synchronize vibration of a video game controller to video content. In certain embodiments, the command signals embedded within the audio-visual feed for the stimulus module 450 provide immersive stimuli that are output independent of the audio-visual content experienced by the user. As such, electronic media utilized with the present invention will require the addition of such embedded coding.

The modular sensory immersion system 400 processes these stimuli commands and sends the commands to the controller 452 of the stimulus module 450 through the active panel data input 468. Once received at the controller 452 of the stimulus control module 450, the controller 452 determines which sensory control module is implicated by the data command.

To provide each immersive stimuli, each stimulus control module includes one or more specific sensory control modules such as the sensory control modules 472, 474, 476, 478, illustrated in FIG. 4B. The sensory control modules 472, 474, 476, 478 of the stimulus module 450 may be interconnected by the local interface 424, which passes data to and from the various sensory control modules as well as other components in communication with the stimulus module. Further, the processor 454 can communicate with any one of the sensory control modules 472, 474, 476, 478 and the memory 458 via the local interface 424 in order to carry out one or more functions, including the functions associated with methods described herein.

The air control module 472 is a control module for controlling and monitoring the emission of ambient bursts of air. In certain embodiments, the bursts of air are heated or cooled to provide a desired effect. For example, for a virtual reality scenario where movement is simulated, the modular sensory immersion system 400 provides bursts of air through a fan-like stimulus module 450 to allow the user to feel the air movement vector associated with virtual scenario. The bursts of air can be synchronously activated from appropriately positioned active panels. In another embodiment, heated air busts from a built-in heating element in a fan-like stimulus module 450 could simulate the heat of an explosion. In certain embodiments, the air control module 472 includes a fan or a blower (not shown) to emit air bursts. In certain embodiments, the air control module 472 also includes a heating and/or cooling device (not shown) for heating and/or cooling the air.

The scent control module 474 (or the aroma module) is a control module for controlling and monitoring the emission of a specific scent. For example, during a virtual realty scenario where explosions are occurring, the modular sensory immersion system 400 causes a stimulus module 450 to emit, through a scent control module 474, the scent of such explosions in synchrony with their occurrence in the virtual reality sequence. In one embodiment, the scent is also emitted as a burst of scented air. As such, in certain embodiments, the scent control module 474 also includes a fan or a blower (not shown).

The water control module 476 is a control module for controlling and monitoring the emission of water droplets, or water vapor. For example, in a virtual reality scenario where rain, fog, or spray are encountered, a modular sensory immersion system 400 causes a stimulus module 450 to utilize the water control module 476 to emit these water-based effects in synchrony with the audio-visual content. It should be appreciated that for such an application, the water control module 476 can include a connection to water or a water reservoir (not shown) for emitting water.

The projectile control module 478 is a control module for controlling and monitoring the emission of small solid or semi solid projectiles. In another virtual reality example scenario, where the user is taking incoming rounds to their body, the modular sensory immersion system 400 causes the stimulus module 450 to emit small projectiles in synchrony with the content. More specifically, the projectile control module 478 of the stimulus module 450 is equipped to fire small projectiles of varying density in a synchronized manner to strike the users body at appropriate points in the virtual reality scenario. In certain embodiments, these projectiles can be ejected via a pneumatic system, and this particular module can be outfitted with its own optical tracking device to remain targeted on the user as he or she moves around in the virtual reality scenario. In certain embodiments, the projectile control module includes a reservoir (not shown) for the small projectiles.

It should be appreciated that the various sensory control modules included within this example embodiment of a stimulus module 450 are merely an illustration of the types of sensory control modules which may be included within the stimulus module 450. Various alternative embodiments may include additional and/or alternative sensory control modules. For example, in one embodiment, the stimulus control module 450 further includes an audio control module for providing a full range audio speaker. More specifically, in certain embodiments, the stimulus module, when inserted into the active panel, provides a full range audio speaker for providing a full-range audio output.

It should be appreciated that the modular sensory immersion system of the present disclosure is configured to process incoming data feeds for all singular and multi-panel embodiments in a manner that enables activation of any transducer or stimulus module independently or in concert with any combination of other transducers or stimulus modules, as directed by the commands embedded within in an audio-visual data feed, or by activation though pressure activated sensors.

Turning to FIG. 5, shown is a flow chart of an example process or method 500 of operating the modular sensory immersion system of the present disclosure with one or more transducers. It should be appreciated that this example embodiment illustrates an example process 500 for receiving audio content embedded within an audio and/or audio-visual signal, and converting the audio content to vibrations output by the modular sensory immersion system of the present disclosure. In various embodiments, process 500 is represented by a set of instructions stored in one or more memories and executed by one or more processors (such as those described above in connection with FIGS. 4A and 4B). Although process 500 is described with reference to the flowchart shown in FIG. 5, many other processes of performing the acts associated with process 500 may be employed. For example, the order of certain of the illustrated blocks may be changed, certain of the illustrated blocks may be optional, or certain of the illustrated blocks may not be employed.

In operation of this embodiment, the modular sensory immersion system receives a signal from an audio output device, as indicated by block 502. More specifically, the modular sensory immersion system 400 receives audio content (or data commands) embedded within an audio and/or audio-visual data feed. In certain embodiments, the modular sensory immersion system receives the data feed through a hard wire input (such as input 112 of the active panel 100 illustrated in FIG. 1). In certain alternative embodiments, the data feed is received via wireless transmission from a media device. As described above, in certain embodiments, the modular sensory immersion system receives these data feeds from, but not limited to, music, an app, a smart phone, a movie, a video game, or a virtual reality feed. These data commands may be either standard elements of the associated media feed, or ones that have been custom programmed for use by this type of system. In certain embodiments, the data feed also includes stimuli commands for a stimulus module to output immersive stimuli in addition to, or instead of, any vibration. These commands are transmitted to and processed by the controller 452 of the stimulus module 450 as described above.

It should be appreciated that in certain multi-panel embodiments, there may be more than one active panel with an audio input. In such an embodiment, an audio signal may be wirelessly transmitted to each of the active panels in synchrony. In certain alternative embodiments, each of the active panels is connected such that the control units of each active panel have been synchronized and a hard wire input to one of the active panels translates to each of the active panels. More specifically, in certain embodiments, a configuration with more than one active panel can employ a modification which links all active panels to one audio source media device. In certain embodiments, if desired, the source audio can also be transmitted through passive panels to link to an active panel. In certain embodiments, where the audio signal is received by a hard wire input the multi-panel configuration includes an external control device for controlling the transmission of the audio signal.

Referring back to FIG. 5, after receiving the audio signal, the modular sensory immersion system splits the audio signal between the vibration transducer 418 and the audio signal output 422, as indicated by block 504. In certain embodiments the audio output 422 is connected to an external speaker or external head phones. In certain embodiments, that connection is a hard wire connection. In other embodiments, that connection is a wireless connection. In certain embodiments, the active panel includes a speaker and the audio output 422 is connected to the speaker within the active panel. In an alternative embodiment, one or more of the passive panels includes a speaker and the audio output 422 is connected to a speaker within a passive panel.

It should be appreciated that in certain embodiments, if the data feed includes stimuli commands for other stimuli output through the stimulus module, such commands are processed independent of the vibration output by the stimulus module controller. Such stimuli output may be output in synchrony with the vibration, or may be output independent of any vibration according to the specific command within the data feed.

Referring back to FIG. 5, the modular sensory immersion system converts the audio signal to a vibration at the desired frequency range through the vibration transducers, as indicated by block 506. In certain embodiments, the modular sensory immersion system will have the capabilities of receiving signals from any audio output device and converting the signals to vibration via vibration transducers in a frequency range preferred but not limited to 6 Hz to 650 Hz. Audio to speakers or earphones can be delivered in the range of 20 Hz to 20,000 Hz.

After converting the audio signal to a vibration, the modular sensory immersion system then simultaneously outputs the vibration at the desired frequency, as indicated by block 508, and outputs the audio signal to the speaker or headphones, as indicated by block 510. Because the audio signal is split between the vibration transducers and a headphone or built in speaker output, this output will preferably facilitate a separate volume control between vibration transducers and auditory speakers/earphones. More specifically, splitting the audio signal enables the user to take the split stereo signal and amplify it to create the desired tactile vibration intensity independent of the synchronized speaker/earphone volume which will also be separately adjustable.

Thus, as illustrated in FIG. 5, the process 500 includes enabling the modular sensory immersion system to receive the user input regarding desired tactile vibration intensity, as indicated by block 512, independent of any user input regarding the audio signal. The modular sensory immersion system also receives user input regarding the desired audio amplification, as indicated by block 514, independent of the tactile vibration intensity.

If the modular sensory immersion system receives any user modifications to the vibration or audio output, the modular sensory immersion system modifies the vibration intensity in response to any user input, as indicated by block 516, and modifies the audio signal in response to any user input, as indicated by block 518.

Thus, various embodiments of the present disclosure provide a system with single or multiple connectable panels that can be built up or broken down in any manner the consumer sees fit for audio synchronized haptic force feedback as well as a full range of other audio or audio-visually synchronized sensations. A single panel of this system can be applied to the consumer's desire for immersive audio synchronized force feedback and other immersive stimuli for video games, music, virtual reality, watching a movie, playing an app, or expanded for the same purposes into a multiple panel platform for a yoga mat-like configuration, allowing deep, whole body relaxation, meditative states, and all of the therapeutic effects of vibratory stimuli while standing, sitting, or lying down and while synchronized with audio or audio-visual content. Panels can be added to the perimeter of this horizontal platform to build vertical walls that house a variety of stimulus modules that deliver all of the sensory experiences outlined above, synchronized to all forms of audio or audio-visual formats used in electronic multi-media.

Such a configuration is intended to impart audio synchronized haptic force feedback as well as audio and audio-visually synchronized multi-sensory stimuli to the user through either a single panel, multi-panel platform, or a safe smart-room enclosure. The modular sensory immersion system of the present disclosure allows such synchronized stimuli to occur by processing data commands, either though hard wire or wireless transmission from but not limited to, music, an app, a smart phone, a movie, a video game, or a virtual reality feed. These data commands may be either standard elements of the associated media feed, or ones that have been custom programmed for use by this type of system.

The highest evolution of this concept would be the creation of a safe environmental enclosure where a user can interface a standard virtual reality feed to the modular sensory immersion system for audio-visually synchronized multi-sensory stimuli, or a virtual reality scenario where a specific software application has been designed to command and allow interactive activation of multi-sensory stimulus synchronization.

Any process descriptions or blocks in the figures, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A sensory immersion device for enhancing media content, comprising:
    a panel having a first segment comprising a first vibration transducer and a second segment comprising a second vibration transducer; and
    a controller disposed in the panel and electrically coupled to each of the first and second vibration transducers, the controller being configured to receive an input signal associated with the media content, and based on the input signal, generate a first vibration output using the first vibration transducer, and generate a second vibration output using the second vibration transducer, each vibration output being synchronized with delivery of the media content to the user.

2. The sensory immersion device of claim 1, wherein each vibration output has a frequency selected from a frequency range of about 20 Hertz to about 50 Hertz.

3. The sensory immersion device of claim 1, wherein the first segment comprises a first foot area configured to receive a first foot of the user, and the second segment comprises second foot area configured to receive a second foot of the user.

4. The sensory immersion device of claim 1, further comprising a data port disposed in the panel and electrically coupled to the controller, the data port being configured to receive the input signal via a cable coupled to the data port.

5. The sensory immersion device of claim 1, further comprising a wireless communications module disposed in the panel and electrically coupled to the controller, the wireless communications module being configured to wirelessly receive the input signal from an external control device.

6. The sensory immersion device of claim 1, further comprising:
    a first pressure sensor disposed in the first segment of the panel; and
    a second pressure sensor disposed in the second segment of the panel,
    each pressure sensor being electrically coupled to the controller and being configured to detect a movement of the user on the panel,
    wherein the controller is further configured to activate the first and second vibration transducers in response to said detection.

7. The sensory immersion device of claim 1, wherein the controller is further configured to receive an amplification input, and in response, modify a vibration intensity of at least one of the vibration outputs.

8. A sensory immersion system for enhancing media content, comprising:
    at least one panel comprising:
        a first segment having a first vibration transducer,
        a second segment having a second vibration transducer, and
        a controller electrically coupled to each vibration transducer and configured to:
            receive an input signal associated with the media content, and
            based on the input signal, generate a first vibration output using the first vibration transducer and a second vibration output using the second vibration transducer; and a control device communicatively coupled to the controller and configured to present the media content to a user, the control device sending the input signal to the controller and synchronizing delivery of the media content with delivery of the vibration outputs to the user via the at least one panel.

9. The sensory immersion system of claim 8, wherein each vibration output has a frequency selected from a frequency range of about 20 Hertz to about 50 Hertz.

10. The sensory immersion system of claim 8, wherein the first segment comprises a first foot area configured to receive a first foot of the user, and the second segment comprises a second foot area configured to receive a second foot of the user.

11. The sensory immersion system of claim 8, wherein the at least one panel further comprises a wireless communications module electrically coupled to the controller, the wireless communications module being configured to wirelessly receive the input signal from the control device.

12. The sensory immersion system of claim 8, wherein the control device is communicatively coupled to an audio listening device for delivering an audio output associated with the media content to the user in synchrony with the vibration outputs.

13. The sensory immersion system of claim 12, wherein the control device is communicatively coupled to a user input/output device for receiving a first amplification input for controlling a vibration intensity of the vibration outputs and a second amplification input for controlling an amplitude of the audio output.

14. The sensory immersion system of claim 13, wherein the controller is further configured to receive the first amplification input from the control device, and in response, modify the vibration intensity of at least one of the vibration outputs.

15. The sensory immersion system of claim 9, wherein the at least one panel further comprises a first pressure sensor disposed in the first segment, and a second pressure sensor disposed in the second segment, each pressure sensor being electrically coupled to the controller and configured to detect a movement of the user on the at least one panel, wherein the controller is configured to activate the vibration transducers in response to said detection.

16. A method of enhancing media content using a sensory immersion device comprising a panel having at least one vibration transducer and at least one processor, the method comprising:
receiving an input signal from an external device;
providing the input signal to a first vibration transducer disposed in a first segment of the panel and to a second vibration transducer disposed in a second segment of the panel; and
based on the input signal, generating a first vibration output using the first vibration transducer and a second vibration output using the second vibration transducer, the vibration outputs being synchronized with delivery of the media content to a user.

17. The method of claim 16, wherein each vibration output has a frequency selected from a frequency range of about 20 Hertz to about 50 Hertz.

18. The method of claim 16, wherein receiving the input signal comprises wirelessly receiving the input signal from an external control device, using a wireless communications module of the panel.

19. The method of claim 16, further comprising:
detecting a movement of the user on the panel using at least one of a first pressure sensor disposed in the first segment and a second pressure sensor disposed in the second segment; and
responsive to said detection, activating the first and second vibration transducers.

20. The method of claim 16, further comprising:
receiving an amplification input via a user input/output device communicatively coupled to the at least one processor; and
in response, modifying a vibration intensity of at least one of the vibration outputs.

* * * * *